July 22, 1930.   N. G. MORICI   1,771,228
POWER TRANSMISSION APPARATUS
Filed July 28, 1926   7 Sheets-Sheet 1

Fig.1.

Witnesses:
William P. Kilroy
Tracy R. L. White

Inventor
Nazarene G. Morici
By Hill & Hill
Attys

July 22, 1930. N. G. MORICI 1,771,228
POWER TRANSMISSION APPARATUS
Filed July 28, 1926 7 Sheets-Sheet 2

Inventor:
Nazarene G. Morici

July 22, 1930.  N. G. MORICI  1,771,228
POWER TRANSMISSION APPARATUS
Filed July 28, 1926     7 Sheets-Sheet 4

Witnesses:
William R. Kilroy
Harry R. L. White

Inventor:
Nazarene G. Morici
By Hill & Hill
Att'ys

Fig.11.

July 22, 1930.  N. G. MORICI  1,771,228
POWER TRANSMISSION APPARATUS
Filed July 28, 1926  7 Sheets-Sheet 6

Witnesses:
William P. Kilroy
Harry R. L. White

Inventor,
Nazarene G. Morici

Patented July 22, 1930

1,771,228

UNITED STATES PATENT OFFICE

NAZARENE GEORGE MORICI, OF CHICAGO, ILLINOIS

POWER-TRANSMISSION APPARATUS

Application filed July 28, 1926. Serial No. 125,455.

My invention relates to power transmission apparatus and particularly to power transmission apparatus adapted for use in connection with internal combustion engines, electrical motors and the like.

The invention has among its objects the production of apparatus of the kind described which is relatively simple in construction, compact, reliable, durable, convenient, efficient and satisfactory for use wherever found applicable.

A particular object of the invention is to provide improved power transmission apparatus for operatively connecting the power plant of an automobile to the propeller shaft thereof.

Another particular object of the invention is to provide improved apparatus of the kind described which is substantially automatic in its operation.

Still another particular object of the invention is to provide improved apparatus of the kind described for an automobile, which apparatus obviates the use of the clutch and brakes the automobile substantially automatically.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 8 is a section taken on line 8—8 of Fig. 1;

Referring for the present to Figs. 1 to 12, inclusive, wherein I have shown power transmission apparatus embodying a preferred form of the invention, the reference characters 20 and 21 designate driving and driven shafts, respectively, which are operatively connected through the improved apparatus. For the purposes of this disclosure, the driving shaft 20 may be described as the crank shaft of an internal combustion engine forming part of an automobile and the driven shaft 21 may be described as the propeller shaft of an automobile, but it will become apparent as this description progresses that the shaft 20 may operatively connect the shaft 21 to any suitable source of power and that the invention is not limited to use in connection with an automobile.

Figure 1:
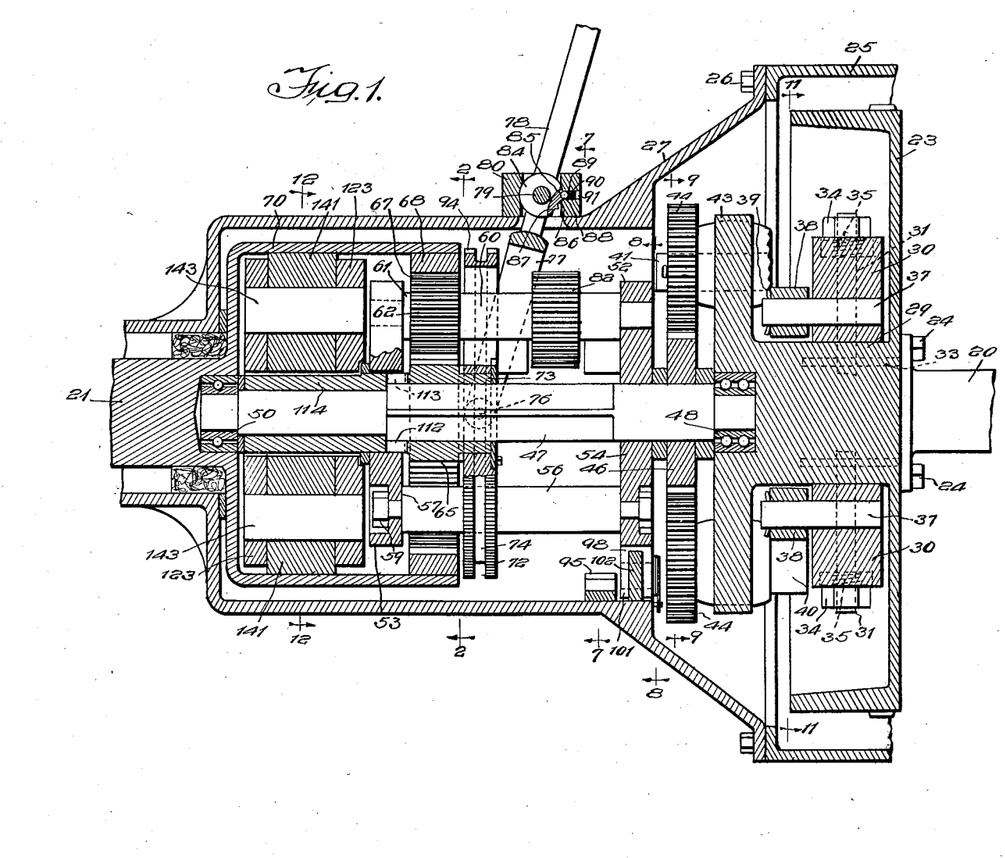
Fig. 1 is a longitudinal central section taken through apparatus embodying the invention.
Figure 11:
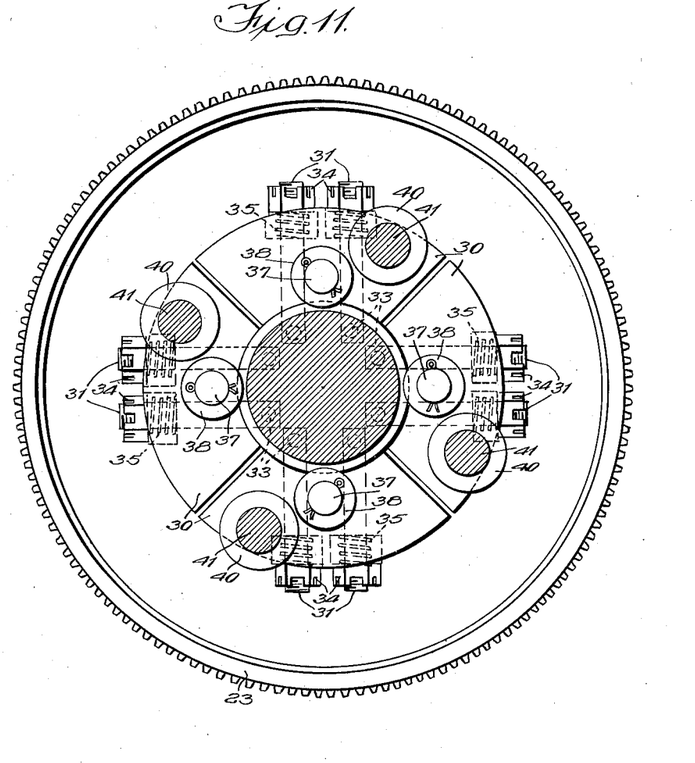
Fig. 11 is a section taken on line 11—11 of Fig. 1.

As best shown in Fig. 1, a fly wheel 23 is rigidly secured to one end of the shaft 20 by bolts 24 or the equivalent, the fly wheel 23 being disposed within a crank case 25 forming part of the internal combustion engine. Rigidly secured to the crank case 25 by bolts 26 or the equivalent is a transmission housing 27. The fly wheel 23 is preferably provided with an integral central boss 29 which carries a plurality of weights or members 30, each member 30 being slidably mounted upon a pair of bolts or pins 31 projecting from the boss 29. This construction is more fully shown and described in my co-pending application Serial No. 752,672, filed November 28, 1924. It will be noted that the inner ends of the pins 31 are rigidly secured to the boss 29 by pins 33 driven through the boss and the pins 31. Disposed around each pin 31 and interposed between the associated member 30 and a nut 34 screw-threaded upon the outer end of the pin is a compression spring 35 which yieldingly urges the member 30 into engagement with the boss 29. Projecting from each member 30 and arranged parallel to the axis of rotation of the shafts 20 and 21 is a stud shaft 37 which carries a roller 38, a cotter pin 39, or the equivalent, being provided to prevent accidental longitudinal displacement of the roller 38 relative to the shaft 37. As best shown in Fig. 11, a roller 40 is disposed adjacent each anti-friction roller 38, the rollers 40 being secured upon pins 41 fixed in an annular flange 43 preferably formed integral with the boss 29. When the apparatus is not in operation and the several parts thereof are at rest, there is preferably a slight clearance between each pair of rollers 38 and 40, but this clearance is preferably so small as to be practically negligible. A plurality of pinions 44 secured to the shafts 41 mesh with a gear 46 rigidly secured to a shaft section 47, one end of which is rotatably journaled in the boss 29. It will be noted that I preferably provide a ball bearing 48 for so journaling this end of the shaft section 47 in the boss 29. The other end of the shaft section 47 is preferably provided in a ball bearing 50, or the equivalent, mounted in one end of the propeller shaft 21.

Figures 2, 3, 4, 5, 6:
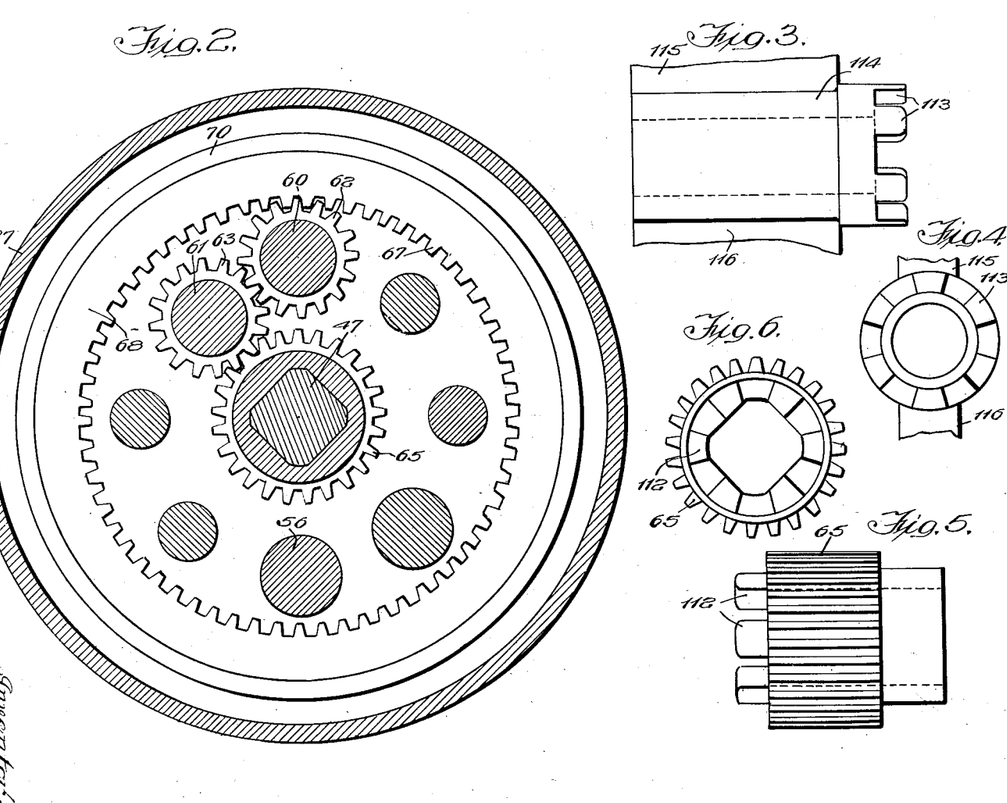
Fig. 2 is a section taken on line 2—2 of Fig. 1.
Fig. 3 is a side elevation of a member forming part of the apparatus shown in Fig. 1.
Fig. 4 is an end elevation of the member shown in Fig. 3.
Fig. 5 is a side elevation of a member adapted to cooperate with the member shown in Fig. 3.
Fig. 6 is an end elevation of the member shown in Fig. 5.
Figure 6:
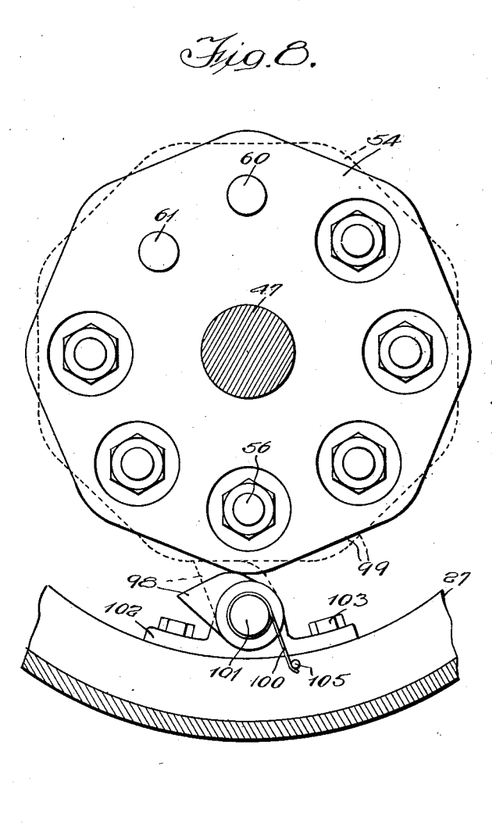

Rotatably journaled upon the shaft section 47 is a cage 52 comprising plates 53 and 54, the plates 53 and 54 being held in spaced relation by a plurality of posts 56 having shoulders 57 against which the plates abut. The plates are secured to the posts by nuts 59 screw-threaded upon the posts. Rotatably journaled in the plates 53 and 54 are shafts 60 and 61 (see Figs. 1 and 2). Rigidly secured to the shaft 60 is a pinion 62 which meshes with a pinion 63 secured to the shaft 61, the pinion 63 being arranged to mesh with a gear 65 slidably mounted upon the shaft section 47. As best shown in Figs. 1 and 2, the shaft section 47 is provided with a portion of substantially rectangular cross section to slidably journal the gear 65. The pinion 62 meshes with an internal gear 67 cut in a ring 68 rigidly secured in an annular flange 70 which is preferably formed integral with the propeller shaft 21. The construction is such that when the apparatus is in the position wherein it is illustrated in Fig. 1, and the shaft section 47 is driven at a relatively low speed in a manner hereinafter described, the rotation of the shaft section 47 is imparted to the propeller shaft 21 through the gears 65 and 67 and the pinions 62 and 63, the shaft 21 being caused to rotate in the same direction as the shaft section 47 but at a lower rate of speed. The purpose of this construction is to increase the torque of the propeller shaft. Referring to Fig. 2, it will be noted that two of the posts 56 are diametrically disposed with respect to the shafts 60 and 61 and are substantially of the same diameter as the shafts to counterbalance them.

Means is provided whereby the gear 65 may be longitudinally displaced along the shaft section 47 to bring it into and out of mesh with the pinion 63, this means preferably comprising a collar 72 journaled on a hub 73 which is formed integral with the gear 65. The collar 72 is apertured to accommodate the posts 56 and the shafts 60 and 61 and is preferably provided with a circumferential groove 74, a pair of pins 76 carried by a fork 77 being adapted to ride in the groove 74. The fork 77 is carried by one end of a lever 78 which is pivoted by a pin 79 intermediate its ends, the pin 79 being mounted in a bracket member 80 rigidly secured to the housing 27. The arrangement is such that when the lever 78 is angularly displaced in a counterclockwise direction (Fig. 1) around its pivotal axis, the gear 65 is disengaged from the pinion 63 and brought into mesh with a pinion 82 formed integral or secured to the shaft 60. The lever 78 is preferably provided with a hub 84 to receive the pin 79, and it will be noted that the hub 84 is provided with a plurality of depressions 85, 86 and 87 engageable by a ball 88 disposed in a bore 89 formed in the bracket member 80, the ball 88 being urged toward the hub 84 by a spring 90 disposed between the ball and a plug 91 screw-threaded into the bore 89. When the gear 65 is in mesh with the pinion 63, the ball 88 engages the depression 85 and yieldingly prevents accidental displacement of the lever 78. When the gear 65 is in mesh with the pinion 82, the ball engages the depression 87 and prevents accidental displacement of the lever. The depression 86 is provided so that the ball may engage it and yieldingly hold the gear 65 in a position intermediate the pinions 63 and 82 so that the transmission may be said to be in a "neutral position".

Figure 7:
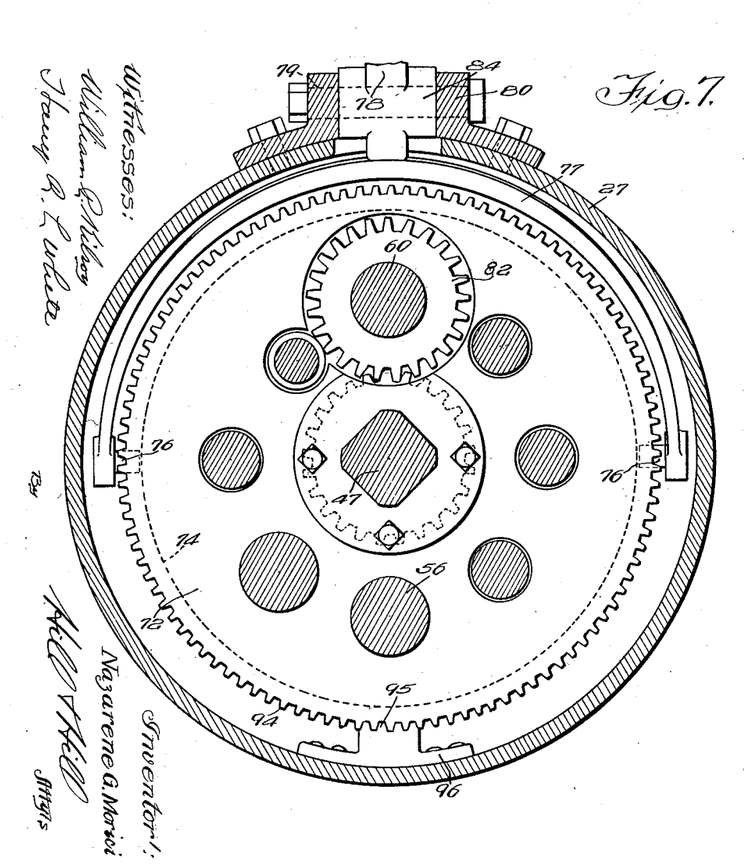
Fig. 7 is a section taken on line 7—7 of Fig. 1.

The collar 72 is preferably provided with gear teeth 94 adapted to mesh with a gear segment 95, when the gear 65 is in mesh with the pinion 82, the gear segment 95 being rigidly secured to the housing 27 by rivets or screws 96 or the equivalent (see Fig. 7). At this point in the description, it may be well to point out that when the gear 65 is in mesh with the pinion 82 and the shaft section 47 is driven in a clockwise direction (Fig. 2), the gear 65 will drive the pinion 82 and the pinion 62 will drive the gear 67 to cause the shaft 21 to rotate in a counterclockwise direction. Of course, it is readily understood that when the shaft 21 is driven in a counterclockwise direction the automobile will be driven in a backward direction.

Means is provided for controlling rotation of the cage 52 as a unit around the longitudinal axis of the shaft section 47, this means preferably comprising a dog 98 engageable with flat surfaces 99 formed upon the plate 54, the plate 54 thereby constituting a ratchet cooperating with the dog. Referring to Fig. 8, it will be noted that the plate 54 may rotate in a clockwise direction (Fig. 8) without being effectively engaged by the dog 98, but when the plate tends to rotate in a counterclockwise direction (Fig. 8) a spring 100 is adapted to bring the dog into engagement with one of the flat surfaces 99 and lock the plate against such movement. The dog 98 is preferably pivoted upon a pin 101 mounted in a bracket member 102 which is rigidly secured to the housing 27 by bolts 103, or the equivalent. The spring 100 is preferably wound around the pin 101 and has one of its ends secured to the dog, the other end of the spring being held by a pin 105 projecting from the housing 27.

Figures 9, 10, 12:
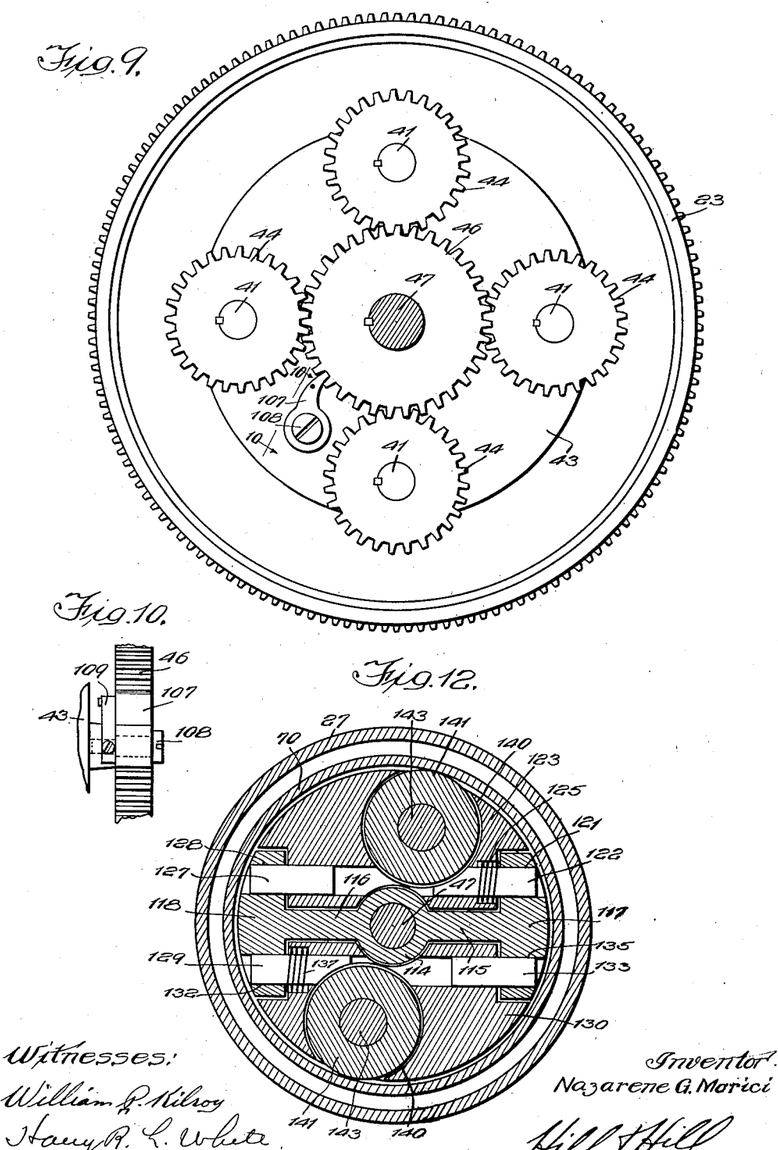
Fig. 9 is a section taken on line 9—9 of Fig. 1.
Fig. 10 is a section taken on line 10—10 of Fig. 9.
Fig. 12 is a section taken on line 12—12 of Fig. 1.

In the embodiment of the invention illustrated in Figs. 1 to 12, inclusive, means is also preferably provided for controlling the direction of rotation of the gear 46. Thus, I preferably provide a pawl 107 pivoted upon a pin 108 projecting from the flange 43, a leaf spring 109 carried by the flange 43 being adapted to yieldingly urge the pawl into engagement with the teeth of the gear 46. As best shown in Fig. 9, the pawl 107 permits the gear 46 to rotate freely in a clockwise direction (Fig. 9) with respect to the axis of rotation of the flange 43, but prevents counterclockwise rotation (Fig. 9) of the gear with respect to the axis of rotation of the flange. The purpose of this construction will presently appear.

The gear 65 is preferably provided with clutch jaws 112 engageable with clutch jaws 113 provided upon one end of a member 114 rotatably journaled upon the shaft section 47 (see Figs. 1 and 3 to 6, inclusive). The member 114 is preferably provided with radially extending integral arms 115 and 116, which are preferably provided with heads 117 and 118, respectively, at their outer ends. Slidably journaled in bores 121 provided in the head 117 are a pair of pins 122 which project from a weight or member 123 and are preferably secured thereto. Disposed around each pin 132 and interposed upon the member 123 and the head 117 is a compression spring 125 which yieldingly urges the member 123 to the left (Fig. 12). Aligned with the pins 122 and projecting from the member 123 are a pair of pins 127 which are slidably journaled in bores 128 formed in the head 118. A pair of pins 129 fixed to a weight or member 130, which is substantially identical with the weight or member 123, are slidably journaled in bores 132 provided in the head 118, and a pair of pins 133 aligned with the pins 129 project from the member 130 and are slidably journaled in bores 135 provided in the head 117. Disposed around the pins 129 and interposed between the head 118 and the member 130 are a pair of compression springs 137 which yieldingly urge the member 130 to the right (Fig. 12). Each of the members 123 and 130 is preferably provided with a pocket or recess 140 to accommodate a roller 141 rotatably journaled upon a pin 143 mounted in the member 123, or 130, as the case may be.

The members 123 and 130 and the parts immediately associated therewith resemble the apparatus shown and described in my copending application, Serial No. 752,672, filed November 28, 1924, the arrangement being such that when the clutch jaws 112 effectively engage the clutch jaws 113 and the shaft section 47 is rotated at a relatively high speed, the members 123 and 130 move tangentially against the action of the springs 125 and 137 and bring the rollers 141 into engagement with the inner surface of the cylindrical flange 70, it being understood, of course, that the members 123 and 130 are rotated bodily in a clockwise direction (Fig. 12) around the longitudinal axis of the shaft section 47. At a predetermined speed, the rollers 141 will be urged against the inner surface of the cylindrical flange 70 with sufficient force to cause the propeller shaft 21 to rotate in unison with the shaft section 47. But it is to be understood that the load is picked up gradually by the rollers.

The operation of the above described apparatus is substantially as follows: Assuming that the apparatus is adjusted as illustrated in Fig. 1 and assuming that the internal combustion engine of the automobile is idling at a speed of 150 R. P. M. or thereabouts, the springs 35 retain the members 30 in engagement with the boss 29 and the rollers 38 do not engage the rollers 40. The pinions 44 revolve or race around the gear 46 without transmitting any power to the shaft section 47. Obviously, this portion of the apparatus functions substantially as a clutch for when the speed increases the centrifugal force caused by the members 30 causes them to be displaced against the action of the springs 35 to bring the rollers 38 into engagement with the rollers 40. The leverage or pressure exerted by the rollers 38 upon or against the rollers 40 will gradually overcome and retard the rotation of the rollers 40 and the pinions 44 around their respective axes of rotation until at a predetermined speed the leverage action of the rollers 38 upon the rollers 40 will be of sufficient force to prevent rotation of the pinions 44 and rollers 40 around their axes of rotation. The pinions 44 will then cause the gear 46 to rotate in unison with the shaft 20, this movement being transmitted to the shaft section 47. As explained above, rotation of the shaft section 47 will be accompanied by the rotation of the splined gear 65 which will drive the pinions 63 and 62 so that the gear 67 will rotate the propeller shaft 21. It is readily understood that the speed of rotation of the propeller shaft 21 will increase proportionately as the speed of rotation of the gear 46 and the shaft section 47 increases so that the load will be picked up gradually. Any tendency of the cage 52 to rotate in a counterclockwise direction (Fig. 8) will cause the plate 54 to be engaged by the dog 98 in such manner that the cage will be locked against rotation in a counterclockwise direction (Fig. 8).

Now assuming that the engine speed is increased, it is obvious that the rollers 141 will be brought into engagement with the inner surface of the cylindrical flange 70 and that they will gradually pick up the load until the engine speed is sufficient to cause them to engage the flange with sufficient force to rotate it in unison with the shaft section 47. The propeller shaft 21 will then be directly coupled to the shaft 20 and will rotate in unison therewith, the cage 52 and the parts carried thereby rotating as a unit around the axis of the shaft section.

Assuming that the throttle of the automobile is now closed, the engine will then be supplied with just enough fuel to drive it at its idling speed. Obviously, the engine will then brake the vehicle through the gear 67, the pinions 62 and 63, the gear 65, the shaft section 47, the gear 46, the ratchet pawl 107, and then through the fly wheel 23 and crank shaft 20. Then as the speed of the engine continues to decrease until the engine is substantially idling, the springs 35 will cause the rollers 38 to be disengaged from the rollers 40, whereupon the pinions 44 will again revolve or race around the gear 46 and the crank shaft 20 will not drive or be driven by the propeller shaft 21. Of course, the automobile is provided with the usual brake and the automatic braking action of the engine may be assisted thereby to bring the automobile to a stop.

If it is desired to drive the automobile in a rearward direction, the lever 78 is shifted into a position wherein the gear 65 meshes with the pinion 82 and the gear teeth 94 engage the teeth of the gear segment 95. Then, when the throttle of the automobile is opened and the speed of the engine is increased to cause the pinions 44 to drive the gear 46 and the shaft section 47 in a clockwise direction (Fig. 7), the rotation of the shaft section will be imparted to the propeller shaft 21 through the pinion 82 and the gear 67, the propeller shaft being rotated in the opposite direction.

If at any time it is desired to race the engine or to make tests thereon in order to adjust the carburetor, or any other apparatus associated with the engine, the lever 78 may be shifted into the position wherein the ball 88 engages the depression 86, the gear 65 will then be positioned between the pinion 63 and the pinion 82 and the transmission may be said to be in "neutral" position.

Figure 13:
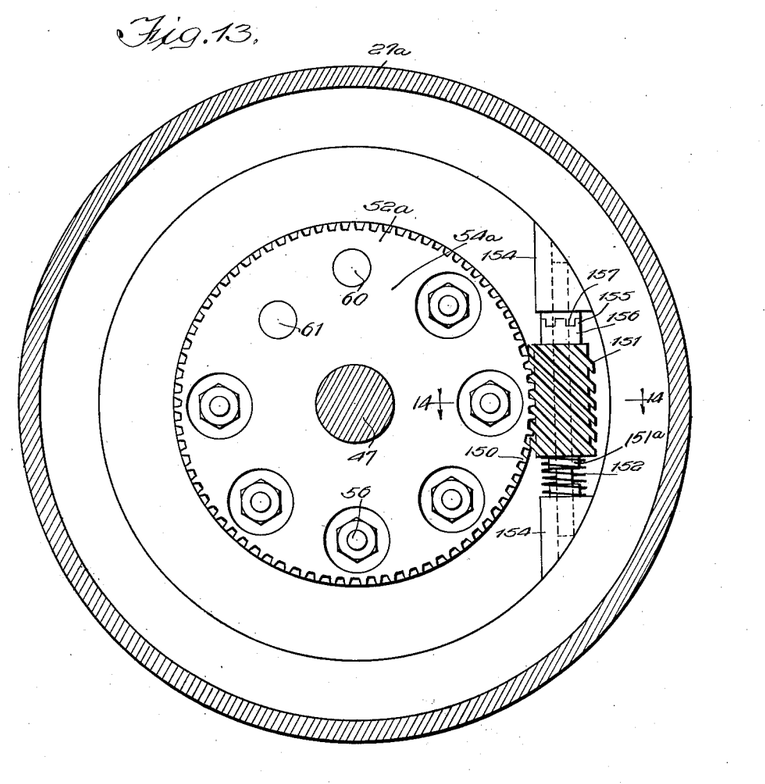
Fig. 13 is a transverse section taken through power transmission apparatus embodying another form of the invention.
Figure 14:
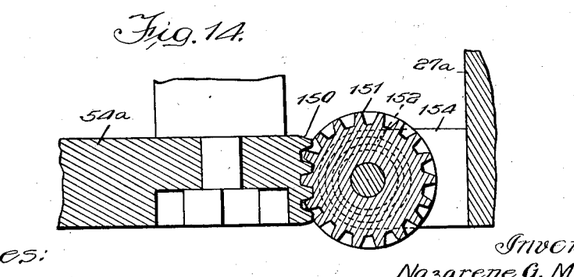
Fig. 14 is a section taken on line 14—14 of Fig. 13.

In Figs. 13 and 14, I have shown another form of the invention embodied in apparatus which may be employed in place of the aforementioned dog 98 to prevent rotation of the cage carrying the shafts 60 and 61. In the drawings I have shown a cage $52^a$ which is identical with the aforementioned cage 52 with the exception that the plate 54 is replaced by a disc $54^a$ having a worm gear 150 formed thereon and arranged to mesh with a worm 151. The worm 151 is rotatably and slidably journaled upon a shaft $151^a$ mounted in bearings 154 formed integral with or secured to a transmission housing $27^a$ which closely resembles the aforementioned transmission housing 27. A plurality of clutch jaws 155 formed integral with a hub 156 projecting from the worm 151 are engageable with clutch jaws 157 projecting from one of the bearings 154, the jaws 155 being yieldingly urged into engagement with the jaws 157 by a compression spring 152 interposed between the worm and one of the bearings 154. Fig. 13 is a section corresponding to the section taken on line 8—8 of Fig. 1 and it is obvious that when the shaft section 47 is rotated in a clockwise direction, the worm 151 will be displaced to bring the jaws 155 out of engagement with the jaws 157. The worm gear 150 will then rotate the worm 151 and the worm will not appreciably retard the continued rotation of the shaft section. However, if the cage $52^a$ tends to rotate in a counterclockwise direction, the worm gear 150 will displace the worm 151 into a position wherein the clutch jaws 155 engage the clutch jaws 157 and the cage will be locked against further rotation in a counterclockwise direction (Fig. 13).

While I have shown the spring 152 for yieldingly urging the jaws 155 into engagement with the jaws 157, it is readily understood that in some instances I may prefer to omit the spring as the worm gear 150 will displace the worm 151 without aid from the spring on account of the side thrust peculiar to worm gears.

Figure 15:
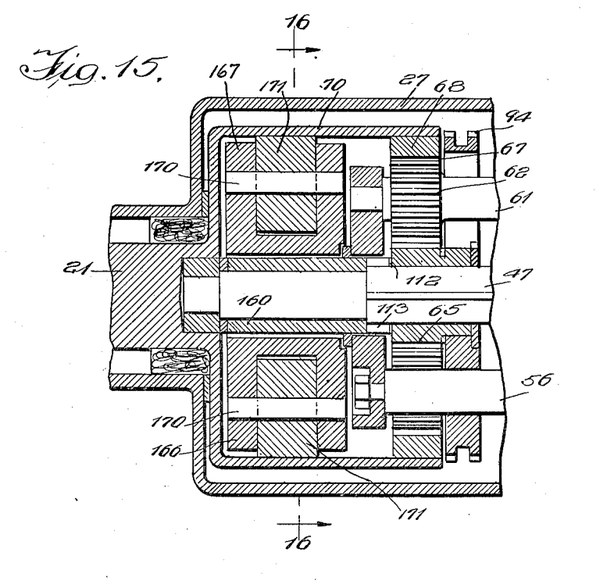
Fig. 15 is a fragmentary longitudinal central section taken through power transmission apparatus embodying still another form of the invention.
Figure 16:
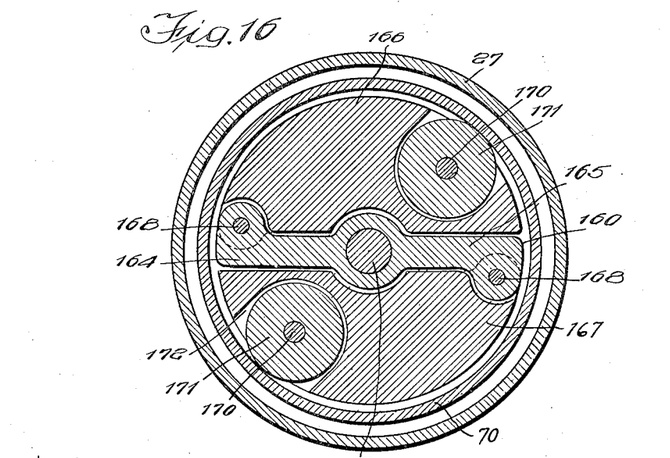
Fig. 16 is a section taken on line 16—16 of Fig. 15.

Referring now to Figs. 15 and 16 wherein

I have shown still another form of the invention embodied in mechanism which may be used in place of the above described members 123 and 130 and the rollers 141 carried thereby, the reference character 27 designates the transmission housing which is preferably identical with the housing 27 shown in Fig. 1. The propeller shaft 21 is also identical with the propeller shaft shown in Fig. 1 and comprises a cylindrical flange 70. Mounted upon the shaft section 47 in place of the member 114 is a member 160 which is free to rotate around the shaft section when the clutch jaws 113 formed integral with the member are not engaged by the clutch jaws 112 formed upon the gear 65. However, when the clutch jaws 113 are engaged by the clutch jaws 112, the member 160 is constrained to rotate in unison with the shaft section 47. The member 160 preferably comprises laterally extending arms 164 and 165 to which weights or members 166 and 167, respectively, are pivoted by pins 168. Each of the members 166 and 167 is provided with a recess 172 to accommodate a roller 171 rotatably journaled upon a pin 170 carried by the member 166 or 167, as the case may be. The arrangement is such that when the shaft section 47 is driven at a predetermined speed in a counterclockwise direction (Fig. 16) the rollers 171 engage the inner surface of the cylindrical flange 70 and tend to rotate the flange around the axis of the shaft section. Then, as the engine speed increases, the rollers 171 gradually pick up the load until they engage the flange 70 with sufficient force to cause it to rotate in unison with the shaft section, thus causing the propeller shaft 21 to rotate at engine speed. I have found that the mechanism illustrated in Fig. 16 is much more efficient than the alternative mechanism shown in Fig. 12.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. Power transmission apparatus comprising a driving shaft, a driven shaft, a shaft section interposed between the driving shaft and the driven shaft and having an axis of rotation coincident with the axis of rotation of the driving and driven shafts, said shaft section disconnected from said driving shaft at relatively low speeds of rotation of said driving shaft, means interposed between the driving shaft and the shaft section for effectively connecting them to each other, said means including a gear and planetary pinion connection and a centrifugal weight operatively related to said pinion for retarding the rotation thereof when the driving shaft rotates at a predetermined speed, means disassociated with said driving shaft and including a plurality of gears interposed between the shaft section and the driven shaft for imparting rotation of the shaft section to the driven shaft at reduced speeds, and means engageable with one of said last mentioned gears for reversing the direction in which the driven shaft is rotated.

2. Power transmission apparatus comprising a driving shaft, a driven shaft, a shaft section interposed between the driving shaft and the driven shaft and having an axis of rotation coincident with the axes of rotation of the driving and driven shafts, said shaft section disconnected from said driving shaft at relatively low speeds of rotation of said driving shaft, means comprising gears and means for operatively connecting said gears to said driving shaft interposed between the driving shaft and the shaft section for effectively connecting them to each other when the driving shaft rotates at a predetermined speed, means disassociated with said driving shaft and including a gear constrained to rotate with the shaft section for imparting rotation of the shaft section to the driven shaft, and means for causing the driven shaft to rotate in unison with the shaft section when the shaft section rotates at a predetermined speed.

3. Power transmission apparatus comprising a driving shaft, a driven shaft, a shaft section interposed between the driving shaft and the driven shaft and having an axis of rotation coincident with the axes of rotation of the driving and driven shafts said shaft section disconnected from said driving shaft at relatively low speeds of rotation of said driving shaft, means comprising gears and means for operatively connecting said gears to said driving shaft interposed between the driving shaft and the shaft section for effectivey connecting them to each other when the driving shaft rotates at a predetermined speed, means disassociated with elements connected to said driving shaft and including a plurality of gears interposed between the shaft section and the driven shaft for imparting rotation of the shaft section to the driven shaft at reduced speed, and means for causing the driven shaft to rotate in unison with the shaft section when the shaft section rotates at a predetermined speed.

4. Power transmission apparatus comprising a driving shaft, a driven shaft, a shaft section interposed between the driving shaft and the driven shaft and having an axis of rotation coincident with the axes of rotation of the driving and driven shafts, means interposed between the driving shaft and the shaft section for effectively connecting them to each other when the driving shaft rotates at a predetermined speed, means including a sliding gear constrained to rotate with the shaft section for imparting rotation of the shaft section to the driven shaft, means for causing the driven shaft to rotate in unison with the shaft section when the shaft section rotates at a predetermined speed, and means engageable with said sliding gear for reversing the direction in which the driven shaft is rotated.

5. Power transmission apparatus comprising a driving shaft, a driven shaft, a shaft section interposed between the driving shaft and the driven shaft and having an axis of rotation coincident with the axes of rotation of the driving and driven shafts said shaft section disconnected from said driving shaft at relatively low speeds of rotation of said driving shaft, means comprising gears and means for operatively connecting said gears to said driving shaft interposed between the driving shaft and the shaft section for effectively connecting them to each other when the driving shaft rotates at a predetermined speed, means distinct from parts connected to said driving shaft and including a plurality of gears interposed between the shaft section and the driven shaft for imparting rotation of the shaft section to the driven shaft at reduced speed, means for causing the driven shaft to rotate in unison with the shaft section when the shaft section rotates at a predetermined speed, and means engageable with one of said gears for reversing the direction in which the driven shaft is rotated.

6. Power transmission apparatus comprising a driving shaft, a driven shaft, a shaft section interposed between the driving shaft and the driven shaft, means interposed between the driving shaft and the shaft section for effectively connecting them to each other when the driving shaft rotates above an idling speed, means independent of said driving shaft and including a plurality of gears interposed between the shaft section and the driven shaft for imparting rotation of the shaft section to the driven shaft at reduced speed, means for causing the driven shaft to rotate in unison with the shaft section when the shaft section rotates at a predetermined speed, and means for operatively connecting said shaft section and said driving shaft when said shaft section tends to rotate faster than said driving shaft.

7. Power transmission apparatus comprising a driving shaft, a driven shaft, a shaft section interposed between the driving shaft and the driven shaft, means interposed between the driving shaft and the shaft section for connecting them to each other when the driving shaft rotates above an idling speed, means interposed between the shaft section and the driven shaft for imparting rotation of the shaft section to the driven shaft at reduced speed, said last mentioned means comprising a plurality of posts spaced about said shaft section and rotatable thereabout as an axis, gear means secured to said driven shaft, a gear on one of said posts operatively connected to said gear means, a gear on a second post in mesh with said last mentioned gear, a gear splined to said shaft section and adapted to mesh with said gear on said second post, means restricting rotation in one direction of said posts about said shaft section, and means for directly connecting said shaft section and said driven shaft at a predetermined speed of rotation of said shaft section.

8. Power transmission apparatus comprising a driving shaft, a driven shaft, a shaft section interposed between the driving shaft and the driven shaft, means interposed between the driving shaft and the shaft section for connecting them to each other when the driving shaft rotates above an idling speed, means interposed between the shaft section and the driven shaft for imparting rotation of the shaft section to the driven shaft at reduced speed, said last mentioned means including a plurality of posts parallel to and adapted to rotate as a unit about said shaft section, gear means on said driven shaft, a gear on one of said posts engaging said gear means, a second gear on said last mentioned post, a gear on a second post in mesh with the first mentioned gear on said first post, a gear splined to said shaft section and adapted to move selectively into engagement with either the gear on said second post or said second mentioned gear on said first post, a plurality of means for restricting rotation of said posts, and means for directly connecting said driven shaft and said shaft section at a predetermined speed when said splined gear is in mesh with said gear on said second post.

9. Power transmission apparatus comprising a driving shaft, a driven shaft, a shaft section interposed between the driving shaft and the driven shaft, means interposed between the driving shaft and the shaft section for connecting them to each other when the driving shaft rotates above an idling speed, means interposed between the shaft section and the driven shaft for imparting rotation of the shaft section to the driven shaft at a reduced speed, said last mentioned means including a plurality of posts rotatably mounted on and parallel to said shaft section, a cylindrical flange on said driven shaft, a ring gear on said flange, a gear on one of said posts, said gear in mesh with said ring gear, a gear on a second post in mesh with said gear on said first post, a gear splined to said shaft section and slidable into mesh with said gear on said second post, said splined gear having clutch jaws, centrifugal means rotatably mounted on said shaft section within said cylindrical flange and adapted to rigidly engage said flange at a predetermined speed of rotation, clutch jaws on said centrifugal means engageable with said first mentioned clutch jaws when said splined gear is in mesh with said gear on said second shaft, and means restraining rotation of said posts about said shaft section in one direction, whereby when said driving shaft rotates at a speed to be connected to said shaft section said driven shaft rotates at reduced speed until said centrifugal means rotates at a sufficient speed to rigidly engage said cylindrical flange whereupon said driven shaft rotates at the same speed as said shaft section.

10. Power transmission apparatus comprising a driving shaft, a driven shaft, a shaft section interposed between the driving shaft and the driven shaft and having an axis of rotation coincident with the axes of rotation of the driving and driven shafts, said shaft section disconnected from said driving shaft at relatively low speeds of rotation of said driving shaft, means comprising gears and means for operatively connecting said gears to said drive shaft interposed between the driving shaft and the shaft section for effectively connecting them to each other when the driving shaft rotates at a predetermined speed, means disassociated from said driving shaft and including a planetary gear for imparting rotation of the shaft section to the driven shaft, and means for connecting said shaft section to said driven shaft whereby they may rotate as a unit and hence rotate said driven shaft in unison with the shaft section when the latter rotates at a predetermined speed.

11. Power transmission apparatus comprising, in combination, a driving shaft, a driven shaft, a shaft section interposed between the driving shaft and the driven shaft and having an axis of rotation coincident with the axes of rotation of the driving and driven shafts, means interposed between the driving shaft and the shaft section for effectively connecting them to each other when the driving shaft rotates at a predetermined speed, said means comprising a radially and bodily movable centrifugal weight operatively related to said driving shaft, a gear and cooperating pinion carried by said shaft section and driving shaft, respectively, and rollers operatively related to said pinion and weight, respectively, and cooperable with each other in a manner to stop the rotation of said pinion when sufficient centrifugal force is exerted on said weight by reason of the predetermined speed of rotation of said driving shaft, means including a sliding gear constrained to rotate with the shaft section and a pinion operatively related thereto and to said driven shaft for imparting rotation of the shaft section to the driven shaft, means for causing the driven shaft to rotate in unison with the shaft section when the shaft section rotates at a predetermined speed, a cage rotatable around said shaft section, means for securing said cage against rotation, and means carried by said cage and engageable with said sliding gear for reversing the direction in which the driven shaft is rotated.

12. Power transmission apparatus comprising, in combination, a driving shaft, a driven shaft, a shaft section interposed between the driving shaft and the driven shaft and having an axis of rotation coincident with the axes of rotation of the driving and driven shafts, means interposed between the driving shaft and the shaft section for effectively connecting them to each other when the driving shaft rotates at a predetermined speed, means including a sliding gear constrained to rotate with the shaft section for imparting rotation of the shaft section to the driven shaft, means for causing the driven shaft to rotate in unison with the shaft section when the shaft section rotates at a predetermined speed, said last mentioned means comprising an annular flange carried by said driven shaft, a member rotatably mounted on said shaft section and connectible thereto in a manner to rotate therewith, a centrifugal weight pivotally related to said member and having means rotatably mounted thereon adapted to cooperate with the inner surface of said flange when sufficient centrifugal force is exerted on said weight by reason of the predetermined speed of rotation of said shaft section, a cage rotatable around said shaft section, means for securing said cage against rotation, and means carried by said cage and engageable with said sliding gear for reversing the direction in which the driven shaft is rotated.

13. Power transmission apparatus comprising a housing, a driving shaft, a driven shaft, a shaft section interposed between the driving shaft and driven shaft, means interposed between the driving shaft and shaft section for connecting them to each other when the driving shaft rotates above an idling speed, means interposed between the shaft section and the driven shaft for imparting rotation of the shaft section to the driven shaft at reduced speed, said last mentioned means comprising a plurality of plates, a plurality of posts mounted therein and spaced about said shaft section and rotatable thereabout said as an axis, gear means secured to said driven shaft, a gear on one of said posts operatively connected to said gear means, a gear on a second post in mesh with said last mentioned gear, a gear splined to said shaft section and adapted to mesh with said gear on said second post, means restricting rotation in one direction of said posts about said shaft section, said last mentioned means comprising spirally formed teeth on one of said plates, a shaft mounted in said housing, clutch teeth formed on said housing and surrounding said last mentioned shaft, a spirally toothed gear rotatably and slidably mounted on said last mentioned shaft and having clutch teeth cooperable with the teeth of said housing, said worm being cooperable with said spirally formed teeth in a manner to be rotated thereby when said plates are rotated in one direction and to cause engagement of said clutch teeth when the plates are moved in the opposite direction, resilient means for normally urging said clutch teeth into engagement with each other, and means for directly connecting said shaft section and said driven shaft at a predetermined speed of rotation of said shaft section.

In testimony whereof, I have hereunto signed my name.

NAZARENE GEORGE MORICI.